United States Patent
Kim et al.

(10) Patent No.: US 10,176,935 B2
(45) Date of Patent: Jan. 8, 2019

(54) ELECTROLYTE COMPOSITION COMPRISING FLUORINATED CARBONATE, AND BATTERY COMPRISING THE SAME

(71) Applicant: SOLVAY SA, Brussels (BE)

(72) Inventors: Hag-Soo Kim, Seoul (KR); Ji-hun Lee, Seoul (KR); Ji-Ae Choi, Seoul (KR); Moon-Hyung Choi, Seoul (KR); Eun-Ji Moon, Seoul (KR)

(73) Assignee: SOLVAY SA, Brussels (BE)

( * ) Notice: Subject to any disclaimer, the term of this patent is extended or adjusted under 35 U.S.C. 154(b) by 8 days.

(21) Appl. No.: 15/536,732

(22) PCT Filed: Dec. 17, 2015

(86) PCT No.: PCT/EP2015/080198
§ 371 (c)(1),
(2) Date: Jun. 16, 2017

(87) PCT Pub. No.: WO2016/097129
PCT Pub. Date: Jun. 23, 2016

(65) Prior Publication Data
US 2017/0345581 A1 Nov. 30, 2017

Related U.S. Application Data

(60) Provisional application No. 62/093,768, filed on Dec. 18, 2014.

(30) Foreign Application Priority Data

Feb. 24, 2015 (EP) .................................... 15156244

(51) Int. Cl.
| | | |
|---|---|---|
| H01G 11/64 | (2013.01) |
| H01G 11/54 | (2013.01) |
| H01G 11/04 | (2013.01) |
| H01M 10/0567 | (2010.01) |
| H01M 10/0525 | (2010.01) |
| H01M 10/0569 | (2010.01) |
| H01M 4/131 | (2010.01) |

(52) U.S. Cl.
CPC ............. *H01G 11/64* (2013.01); *H01G 11/04* (2013.01); *H01G 11/54* (2013.01); *H01M 10/0525* (2013.01); *H01M 10/0567* (2013.01); *H01M 10/0569* (2013.01); *H01M 4/131* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 6,203,944 B1 | 3/2001 | Turner et al. | |
| 9,673,450 B2 * | 6/2017 | Chen | ................. C01G 53/54 |
| 2001/0016291 A1 * | 8/2001 | Yang | ................. H01M 10/0525 429/325 |
| 2015/0086877 A1 * | 3/2015 | Yamazaki | ......... H01M 10/0525 429/332 |
| 2016/0145190 A1 * | 5/2016 | Bomkamp | ............. H01G 11/64 429/405 |

FOREIGN PATENT DOCUMENTS

| | | |
|---|---|---|
| EP | 1890357 A1 | 2/2008 |
| EP | 2824096 A1 | 1/2015 |
| WO | 0003444 A1 | 1/2000 |

OTHER PUBLICATIONS

H. Bouayad et al: "Improvement of Electrode/Electrolyte Interfaces in High-Voltage Spinel Lithium-Ion Batteries by Using Glutaric Anhydride as Electrolyte Additive", Journal of Physical Chemistry C, vol. 118, No. 9, Mar. 6, 2014 (Mar. 6, 2014), pp. 4634-4648.
Choi Ji-Ae et al: "Lithium polymer cell assembled by in situ chemical cross-linking of ionic liquid electrolyte with phosphazene-based cross-linking agent", Electrochimica Acta, vol. 89, 2013, p. 359-364.

* cited by examiner

*Primary Examiner* — Sin J Lee

(57) ABSTRACT

Disclosed are electrolyte compositions comprising aryl group containing certain fluorinated carbonate, and batteries, especially batteries having a high nominal voltage, comprising such electrolyte composition.

20 Claims, No Drawings

ELECTROLYTE COMPOSITION COMPRISING FLUORINATED CARBONATE, AND BATTERY COMPRISING THE SAME

This application is a U.S. national stage entry under 35 U.S.C. § 371 of International Application No. PCT/EP2015/080198 filed Dec. 17, 2015, which claims priority to U.S. provisional application No. 62/093,768 filed on Dec. 18, 2014 and European patent application No. 15156244.4 filed on Feb. 24, 2015. The entire contents of these applications are explicitly incorporated herein by this reference.

TECHNICAL FIELD

The present invention relates to electrolyte compositions comprising aryl group containing fluorinated carbonate. The present invention further concerns batteries, especially those having a high nominal voltage, comprising such electrolyte composition.

BACKGROUND OF THE INVENTION

Batteries, including lithium ion batteries, lithium air batteries and lithium sulfur batteries, are well-known rechargeable means for storing electric energy. Lithium ion batteries comprise a cathode, an anode, a separator interposed between the cathode and the anode, and an electrolyte composition containing a solvent, a conductive salt and, often, one or more additives. The cathode and anode usually prepared by applying a composition comprising an active-electrode material, such as a cathode active material and an anode active material (depending on a final application of the electrode), a binder, a solvent, and optionally one or more additives, on a substrate, then drying, and compression-molding.

A nominal cell voltage currently adopted for lithium secondary battery, in particular lithium ion battery, is usually up to 3.7 V. This often corresponds to a charge cut-off voltage of 4.2 V. At the voltage higher than this point, the electrolyte system is often deteriorated because the components of the electrolyte system, such as a solvent, a conducting salt, and an additive, especially the additive material which is believed to form protective layer (often called "solid electrolyte interphase (SEI)") on a surface of electrode(s) on initial charging, cannot endure such high voltage. However, the battery which can be operated at higher voltage (usually at 3.9 V or 4.1 V, or even up to 4.7 V) is desired in the art, and thus, developments of the electrolyte system suitable for the high-voltage batteries, and/or the component for such electrolyte system are required in the art. In terms of the charge cut-off voltage, such high-voltage batteries have charge cut-off voltage of higher than 4.2 V, in particular at least 4.25 V.

In addition, the technically-advantageous electrolyte system for batteries, especially for lithium-ion batteries, is demanded in the art in general.

DESCRIPTION OF THE INVENTION

The objective of the present invention is to provide an electrolyte composition or the component for such electrolyte composition suitable for batteries, especially the batteries having a high nominal voltage. Another purpose of the present invention is to provide a new electrolyte composition system which can provide an effective protection on the surface of both cathode and anode of batteries, especially lithium-ion batteries. Further purpose of the present invention is to provide an electrolyte system for batteries in which an interfacial resistance between an electrode (in particular cathode) and an electrolyte composition is minimized. Still another purpose of the present invention is to provide an electrolyte composition or a component thereof suitable for batteries, especially the secondary batteries having a charge cut-off voltage of more than 4.2 V, in particular at least 4.25 V.

The present invention therefore relates to a battery which comprises a cathode, an anode, and an electrolyte composition, having a nominal voltage of more than 3.7 V and no more than 4.7 V, wherein the electrolyte composition comprises at least one solvent, at least one conductive salt, and a compound of general formula (I),

$$R^1R^2CF-O-C(O)-O-R^3 \quad (I)$$

wherein $R^1$ and $R^2$ are independently H, F, alkyl, cycloalkyl, alkylene-aryl, or alkylene-heteroaryl; and wherein $R^3$ is an aryl group or an alkylene-aryl group.

Another aspect of the present invention therefore relates to a battery which comprises a cathode, an anode, and an electrolyte composition, having a charge cut-off voltage of more than 4.2 V, wherein the electrolyte composition comprises at least one solvent, at least one conductive salt, and a compound of general formula (I),

$$R^1R^2CF-O-C(O)-O-R^3 \quad (I)$$

wherein $R^1$ and $R^2$ are independently H, F, alkyl, cycloalkyl, alkylene-aryl, or alkylene-heteroaryl; and wherein $R^3$ is an aryl group or an alkylene-aryl group.

It has been surprisingly found that the compound of general formula (I) of the present invention can be advantageously used in the electrolyte composition for batteries, in particular those operated at a high nominal voltage. Further, the electrolyte composition comprising the compound of general formula (I) has been found to have an advantageous function in protecting the surface of the electrode(s) of the batteries, especially lithium-ion batteries. Additional advantages of the present invention include high ionic conductivity and low viscosity in the electrolyte composition. In addition, it was found that the electrolyte composition according to the present invention can show a sufficiently low interfacial resistance between an electrode and an electrolyte composition.

In the present invention, the term "alkyl group" is intended to denote in particular an optionally substituted chain of saturated hydrocarbon-based groups, such as, in particular, a C1-C6 alkyl. By way of example, mention may be made of methyl, ethyl, propyl, isopropyl, butyl, t-butyl, pentyl, isopentyl and hexyl. The alkyl may be optionally substituted, e.g. with halogen, aryl, or heteroaryl.

In the present invention, the term "cycloalkyl group" is intended to denote in particular an optionally substituted cycle of saturated hydrocarbon-based groups. By way of example, mention may be made of cyclopropyl, cyclobutyl, cyclopentyl, and cyclohexyl. The cycloalkyl may be optionally substituted, e.g. with halogen, aryl, or heteroaryl.

In the present invention, the term "aryl group" is intended to denote in particular any functional group or substituent derived from an aromatic nucleus. In particular, the aryl groups can have 6 to 20 carbon atoms preferably 6 to 12 carbon atoms, in which some or all of the hydrogen atoms of the aryl group may or may not be substituted with other groups, especially halogen, alkyl groups, alkoxy groups, aryl groups, or hydroxyl groups. Preferably, the aryl group is a C6-C10 aromatic nucleus, in particular phenyl or naphthyl.

In the present invention, the aryl group may be halogenated, in particular may be fluorinated.

In the present invention, the term "heteroaryl group" is intended to denote in particular any compound derived from an aromatic nucleus wherein at least one atom in the nucleus is a heteroatom; preferably the at least one heteroatom is O, S, or N. Specific examples of heteroaryl groups are thiophene, furan, triazole, pyrazole, pyridine, pyrimidine, oxazole, thiazole, and isoxazole.

In the present invention, "halogenated" is understood to denote in particular at least one of the hydrogen atoms of the following chemical group has been replaced by a halogen atom, preferably selected from fluorine and chlorine, more preferably fluorine. If all of the hydrogen atoms have been replaced by halogen atoms, the halogenated chemical group is perhalogenated. For instance, "halogenated alkyl groups" include (per)fluorinated alkyl groups such as (per)fluorinated methyl, ethyl, propyl, isopropyl, butyl, isobutyl, sec-butyl or tert-butyl; and for instance —$CF_3$, —$C_2F_5$, heptafluoroisopropyl (—$CF(CF_3)_2$), hexafluoroisopropyl (—$CH(CF_3)_2$) or —$CF_2(CF_2)_4CF_3$. Non-limiting example of "halogenated aryl groups" include —$C_6F_5$.

In the present invention, $R^3$ is preferably an aryl group or an alkylene-aryl group, more preferably $R^3$ is phenyl or benzyl, most preferably $R^3$ is phenyl.

In the present invention, $R^2$ is preferably H.

In the present invention, $R^1$ is preferably H or an alkyl group, more preferably $R^1$ is methyl.

In the preferred embodiment of the present invention, the compound of general formula (I) is (1-fluoroethyl)phenyl carbonate.

The compound of general formula (I) in the present invention is usually included in the electrolyte composition for batteries. Without wishing to be bound by any theory, the compound of general formula (I) is believed not to deteriorate under the operation at high nominal voltage. In the present invention, the term "nominal voltage" is understood to denote in particular a suitable approximate value of the voltage used to designate a cell, a battery or an electrochemical system, and often denote a mid-point value of the given voltage range. In the present invention, the term "high nominal voltage" is intended to denote in particular the battery's normal voltage being higher than 3.7 V. In the present invention, the nominal voltage is often at least 3.9 V. The nominal voltage is often no more than 4.7 V, preferably no more than 4.5 V, more preferably no more than 4.1 V. The particular range of the nominal voltage is at least 3.9 V and no more than 4.1 V. In the present invention, the batteries having a high nominal voltage often possesses a high charge cut-off voltage, for instance the charge cut-off voltage of more than 4.2 V, preferably at least 4.25 V, more preferably at least 4.3 V, still more preferably at least 4.4 V. In the present invention, the batteries having a high nominal voltage may possess a cut-off voltage of at least 4.25 V, in particular at least 4.5 V, especially at least 4.9 V. Upper limit of the charge cut-off voltage of the batteries having a high nominal voltage may be no more than 5.0 V.

In the present invention, the term "charge cut-off voltage" is understood to denote in particular a voltage at which a battery is considered to be fully charged. In the present invention, the term "discharge cut-off voltage" is understood to denote in particular a voltage at which a battery is considered to be fully discharged. The charge and discharge cut-off voltages are often chosen so that the maximum useful capacity of the battery is achieved. Some electronic devices comprising at least one battery, such as cell phones, are often designed to shut down when the operating voltage of the battery reaches charge or discharge cut-off voltage.

Also, without wishing to be bound by any theory, sufficiently low interfacial resistance between an electrode and an electrolyte composition can be achieved by an addition of the compound of general formula (I) in the electrolyte composition. A concentration of the compound of general formula (I) in the electrolyte composition is generally from 0.1 to 5 wt %, preferably 0.2 to 1.5 wt %, relative to the total weight of the electrolyte composition.

In the present invention, "interfacial resistance" is understood to denote in particular a resistance, especially an electrochemical resistance, caused in an interface between the two different materials, notably between an electrode (such as cathode and anode) and an electrolyte composition in battery system. Such resistance may affect an internal resistance of the battery, and the internal resistance in turn has a substantial impact on various performances of the battery, such as cycle performance. The interfacial resistance may be calculated via AC impedance measurement (J. A. Choi et al., Electrochimica Acta 89 (2013) 359-364) which will be described in more detail in the following embodiments.

An electrolyte composition for batteries generally comprises one or more solvent, and one or more conductive salt and/or additive. Examples of the conductive salt include those having the general formula $M_aA_b$. M is a metal cation, and A is an anion. The overall charge of the salt $M_aA_b$ is 0. M is preferably selected from Li+ and $NR_4$+. More preferably, M is Li+. Preferred anions are $PF_6$—, $PO_2F_2$—, $AsF_6$—, $BF_4$—, $ClO_4$—, $N(CF_3SO_2)_2$— and $N(i-C_3F_7SO_2)_2$—. Preferably, M is Li+. Especially preferably, M is Li+ and the solution comprises at least one electrolyte salt selected from the group consisting of $LiBF_4$, $LiClO_4$, $LiAsF_6$, $LiPF_6$, $LiPO_2F_2$, $LiN(CF_3SO_2)_2$ and $LiN(i-C_3F_7SO_2)_2$. Lithium bis(oxalato)borate can be applied as an additional additive. The concentration of the electrolyte salt is preferably 1±0.2 molar. Often, the electrolyte composition may comprise $LiPF_6$.

In the present invention, the electrolyte composition generally comprises at least one solvent. The solvent of the electrolyte composition preferably includes at least one non-aqueous solvent selected from the group consisting of cyclic carbonates, acyclic carbonates and any combination thereof. Examples of cyclic carbonates include cyclic alkylene carbonates, such as ethylene carbonate, propylene carbonate, vinylidene carbonate and butylene carbonate. Examples of acyclic carbonates include acyclic dialkyl carbonates, such as dimethyl carbonate, methylethyl carbonate and diethyl carbonate. More preferably, the solvent includes at least one organic carbonate selected from the group consisting of acyclic dialkyl carbonates, cyclic alkylene carbonates, and combination thereof, still more preferably from the group consisting of ethylene carbonate, propylene carbonate, and diethyl carbonate. Other suitable solvents can be selected, for example, from lactones, formamides, pyrrolidinones, oxazolidinones, nitroalkanes, N,N-substituted urethanes, sulfolane, dialkyl sulfoxides, dialkyl sulfites, acetates, nitriles, acetamides, glycol ethers, dioxolanes, dialkyloxyethanes, and trifluoroacetamides. Particular examples of the solvents include dimethyl formamide, carboxylic acid amides, for example, N,N-dimethyl acetamide and N,N-diethyl acetamide, acetone, acetonitrile, and any combination thereof. The at least one solvent may occupy the rest of content of the electrolyte composition in addition to the components described herein, particularly in addition to the conducting salt, the compound of general formula (I), and the optional additives. The content of the at least one solvent is preferably 85 to 99 wt %, more preferably 92 to 98.5 wt %, still more preferably 95.5 to 98 wt %, relative to the total weight of the electrolyte composition.

The electrolyte composition in the present invention may further comprise at least one suitable additive. Examples of such additive include halogenated organic compounds. The halogenated organic compounds useful as additives are, for example, fluorinated carbonic esters which are selected from the group of fluorinated ethylene carbonates, polyfluorinated dimethyl carbonates, fluorinated ethyl methyl carbonates, and fluorinated diethyl carbonates are other solvents or, preferably, suitable additives in the electrolyte composition. Preferred fluorinated carbonates are monofluoroethylene carbonate, 4,4-difluoro ethylene carbonate, 4,5-difluoro ethylene carbonate, 4-fluoro-4-methyl ethylene carbonate, 4,5-difluoro-4-methyl ethylene carbonate, 4-fluoro-5-methyl ethylene carbonate, 4,4-difluoro-5-methyl ethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoro ethylene carbonate, 4-(fluoromethyl)-5-fluoro ethylene carbonate, 4-fluoro-4,5-dimethyl ethylene carbonate, 4,5-difluoro-4,5-dimethyl ethylene carbonate, and 4,4-difluoro-5,5-dimethyl ethylene carbonate; dimethyl carbonate derivatives including fluoromethyl methyl carbonate, difluoromethyl methyl carbonate, trifluoromethyl methyl carbonate, bis(difluoro)methyl carbonate, and bis(trifluoro)methyl carbonate; ethyl methyl carbonate derivatives including 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate; and diethyl carbonate derivatives including ethyl (2-fluoroethyl) carbonate, ethyl (2,2-difluoroethyl) carbonate, bis(2-fluoroethyl) carbonate, ethyl (2,2,2-trifluoroethyl) carbonate, 2,2-difluoroethyl 2'-fluoroethyl carbonate, bis(2,2-difluoroethyl) carbonate, 2,2,2-trifluoroethyl 2'-fluoroethyl carbonate, 2,2,2-trifluoroethyl 2',2'-difluoroethyl carbonate, and bis(2,2,2-trifluoroethyl) carbonate, 4-fluoro-4-vinylethylene carbonate, 4-fluoro-5-vinylethylene carbonate, 4,4-difluoro-4-vinylethylene carbonate, 4,5-difluoro-4-vinylethylene carbonate, 4-fluoro-4,5-divinylethylene carbonate, 4,5-difluoro-4,5-divinylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate and 4,5-difluoro-4,5-diphenylethylene carbonate, fluoromethyl phenyl carbonate, 2-fluoroethyl phenyl carbonate, 2,2-difluoroethyl phenyl carbonate and 2,2,2-trifluoroethyl phenyl carbonate, fluoromethyl vinyl carbonate, 2-fluoroethyl vinyl carbonate, 2,2-difluoroethyl vinyl carbonate and 2,2,2-trifluoroethyl vinyl carbonate, fluoromethyl allyl carbonate, 2-fluoroethyl allyl carbonate, 2,2-difluoroethyl allyl carbonate and 2,2,2-trifluoroethyl allyl carbonate. The halogenated organic compound useful as an additive is more preferably fluorinated cyclic carbonates, still more preferably a monofluoroethylene carbonate. Another additive which can be advantageously used includes sultones, such as 1,3-propane sultone, sulfites, such as vinyl ethylene sulfite, and ethylene sulfite, and carbonates, such as vinyl ethylene carbonate, and vinylene carbonate. In the present invention, additional examples of sultones include, but not limited to, 1,4-butane sultone, 1-methyl-1,3-propane sultone, 2-methyl-1,3-propane sultone, 3-methyl-1,3-propane sultone, 1-ethyl-1,3-propane sultone, 2-ethyl-1,3-propane sultone, 3-ethyl-1,3-propane sultone, 1,2-dimethyl-1,3-propane sultone, 1,3-dimethyl-1,3-propane sultone, 2,3-dimethyl-1,3-propane sultone, 1-methyl-2-ethyl-1,3-propane sultone, 1-methyl-3-ethyl-1,3-propane sultone, 2-methyl-3-ethyl-1,3-propane sultone, 1-ethyl-2-methyl-1,3-propane sultone, 1-ethyl-3-methyl-1,3-propane sultone, 2-ethyl-3-methyl-1,3-propane sultone, 1-fluoromethyl-1,3-propane sultone, 2-fluoromethyl-1,3-propane sultone, 3-fluoromethyl-1,3-propane sultone, 1-trifluoromethyl-1,3-propane sultone, 2-trifluoromethyl-1,3-propane sultone, 3-trifluoromethyl-1,3-propane sultone, 1-fluoro-1,3-propane sultone, 2-fluoro-1,3-propane sultone, 3-fluoro-1,3-propane sultone, 1,2-difluoro-1,3-propane sultone, 1,3-difluoro-1,3-propane sultone, and 2,3-difluoro-1,3-propane sultone. Another class of the additive includes borate and borane compounds. These compounds may function as Lewis-acid in the electrolyte composition, and therefore, can improve cycle performance and/or suppress decomposition reaction between cathode and electrolyte. Particular examples of such borate or borane compounds include compounds containing boroxine rings (e.g., trimethylboroxin as well as trimethoxyboroxine (TMOBX) or its derivatives), compounds including boroxine rings with polyalkylene oxide chains (e.g., tris(poly(oxyethylene)) boroxine), and compounds having boroxine rings with substituted or unsubstituted phenyl rings (e.g., triphenyl boroxine, tris(4-fluorophenyl)boroxine, and tris(pentafluorophenyl)boroxine), but the present invention is not limited thereto. Other additives may include derivatives of boronate esters and borinate esters such as difluorophenoxy methyl borane, dihexafluoroisopropoxy methyl borane, and dihexafluoroisopropoxy phenyl borane. Further class of the additive includes isocyanate compounds, especially fluorinated isocyanate compounds. Particular examples of the isocyanate compounds include, but not limited to, methyl isocyanate, ethyl isocyanate, propyl isocyanate, isopropyl isocyanate, butyl isocyanate, isobutyl isocyanate, sec-butyl isocyanate, tert-butyl isocyanate, difluoromethyl isocyanate, monofluoromethyl isocyanate, trifluoromethyl isocyanate, 2,2-difluoroethyl isocyanate, 2-fluoroethyl isocyanate, 2,2,2-trifluoroethyl isocyanate, 3,3,2,2-tetrafluoropropyl isocyanate, 3,2,2-trifluoropropyl isocyanate, pentafluoropropyl isocyanate, 1,1,3,3-tetrafluoro-2-propyl isocyanate, 1,1,1,3,3,3-hexafluoro-2-propyl isocyanate, 2,2,3,3,4,4,4-heptafluorobutyl isocyanate, perfluoro-t-butyl isocyanate, phenyl isocyanate, naphthyl isocyanate, 2-fluorophenyl isocyanate, 3-fluorophenyl isocyanate, 4-fluorophenyl isocyanate, 2,3-difluorophenyl isocyanate, 2,4-difluorophenyl isocyanate, 2,3'-difluorophenyl isocyanate, 2,2'-difluorophenyl isocyanate, 3,3'-difluorophenyl isocyanate, 3,4-difluorophenyl isocyanate, 2,3,4-trifluorophenyl isocyanate, 2,2',3-trifluorophenyl isocyanate, 2,2',4-trifluorophenyl isocyanate, 2,3,3'-trifluorophenyl isocyanate, 2-methylphenyl isocyanate, 4-methylphenyl isocyanate, 2-methoxyphenyl isocynate, 4-methoxyphenyl isocynate, 1,2-phenylene diisocynate, 1,3-phenylene diisocynate and 1,4-phenylene diisocynate. Still further class of the additive includes sulfone-based compounds, such as methyl sulfone, vinyl sulfone, phenyl sulfone, benzyl sulfone, tetramethylene sulfone, and butadiene sulfone. Yet further particular additives, such as lithium difluoro oxalate phosphate (LiDFOP), trimethylsilyl propyl phosphate (TMSPa), 1,3-propene sultone (PRS), and ethylene sulfate (Esa) may be used as the additive for the electrolyte composition according to the present invention. Fluorinated ethylene carbonates, vinylene carbonate, 1,3-propane sultone, vinyl ethylene sulfite, ethylene sulfite, and vinyl ethylene carbonate are believed to be the good additive in forming the protective layer on the surface of the electrode(s). Fluorinated ethylene carbonates, in particular monofluorethylene carbonate, and vinylene carbonate are especially preferred. The additives which can be used in the present invention are not limited thereto. The content of an additive in the electrolyte composition, if any, is preferably 0.1 to 10.0 wt %, more preferably 0.5 to 5.0 wt %, still more preferably 0.5 to 2.0 wt %, relative to the total weight of the electrolyte composition.

Selection and preparation of the electrodes, i.e. an anode, and a cathode, components contained in each of them, and other possibly existing components in the batteries are known in the art, and therefore, can be suitably constructed depending on the target.

For instance, the electrodes of batteries, such as cathode and anode, can be formed from an electrode-forming composition comprising (A) an active-electrode material; (B) a binder; (C) a solvent; and optionally one or more additives.

In the present invention, an expression "active-electrode material" is intended to denote in particular an electro-active particulate material which actively participates in the underlying redox reaction during charge/discharge phenomena of a battery. The nature of the active-electrode material will depend on whether the composition according to the present invention will be used to form a cathode (positive electrode) or an anode (negative electrode). The active-electrode material can thus be selected from active cathode materials, hereinafter referred to as materials (E+), and active anode materials, herein below referred to as materials (E−).

The material (E+) may be selected from the group consisting of:

composite metal chalcogenide represented by a general formula of $LiMY_2$, wherein M denotes one or more than one transition metal, including Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. The lithium-based composite metal oxide, such as $LiCoO_2$, may comprise or consist of layered structure. The composite metal chalcogenide, such as the lithium-based composite metal oxide, may comprise or consist of nano-structure. Preferred examples thereof may include: $LiCoO_2$, $LiNiO_2$, $LiMnO_2$ $LiNi_xCo_{1-x}O_2$ ($0<x<1$), $Li_xCo_{1-y}Al_yO_2$ ($0<x<1$, $0<y<1$) and spinel-structured $LiMn_2O_4$; nevertheless a broader range of chalcogenides might be considered, including those represented by formulae:

$$Li_xMn_{1-y}M'_yA_2 \quad (1)$$

$$Li_xMn_{1-y}M'_yO_{2-z}Z_z \quad (2)$$

$$Li_xMn_2O_{4-z}A_z \quad (3)$$

$$Li_xMn_{2-y}M'_yA_4 \quad (4)$$

$$Li_xM_{1-y}M''_yA_2 \quad (5)$$

$$Li_xMO_{2-z}A_z \quad (6)$$

$$Li_xNi_{1-y}Co_yO_{2-z}A_z \quad (7)$$

$$Li_xNi_{1-y-z}Co_yM''_zA_a \quad (8)$$

$$Li_xNi_{1-y-z}Co_yM''_zO_{2-a}Z_a \quad (9)$$

$$Li_xNi_{1-y-z}Mn_yM'_zA_a \quad (10)$$

$$Li_xNi_{1-y-z}Mn_yM'_zO_{2-a}Z_a \quad (11)$$

wherein:

$0.95 \leq x \leq 1.1$, $0 \leq y \leq 0.5$, $0 \leq z \leq 0.5$, $0 \leq a \leq 2$;

M is Ni or Co, M' is one or more elements selected from a group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, M" is one or more elements selected from a group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, A is selected from the group consisting of O, F, S and P, and Z is selected from the group consisting of F, S, and P;

a lithiated or partially lithiated transition metal oxyanion-based electrode materials of the nominal formula $AB(XO_4)_fE_{1-f}$, in which A is lithium, which may be partially substituted by another alkali metal representing less than 20% of the A metals, B is a main redox transition metal at the oxidation level of +2 chosen among Fe, Mn, Ni or mixtures thereof, which may be partially substituted by one or more additional metal at oxidation levels between +1 and +5 and representing less than 35% of the main +2 redox metals, including 0, $XO_4$ is any oxyanion in which X is either P, S, V, Si, Nb, Mo or a combination thereof, E is a fluoride, hydroxide or chloride anion, f is the molar fraction of $XO_4$ oxyanion, generally comprised between 0.75 and 1. The above $AB(XO_4)_fE_{1-f}$ electrode materials are preferably phosphate-based and may have an ordered or modified olivine structure. More preferably, the powdery electrode material as described above complies with formula $Li_{3-x}M'_yM''_{2-y}(XO_4)_3$ in which: $0 \leq x \leq 3$, $0 \leq y \leq 2$; M' and M" are the same or different metals, at least one of which being a redox transition metal; $XO_4$ is mainly $PO_4$ which may be partially substituted with another oxyanion, in which X is either P, S, V, Si, Nb, Mo or a combination thereof. Still more preferably, the active material is a phosphate-based electrode material having the nominal formula $Li(Fe_xMn_{1-x})PO_4$ in which $0 \leq x \leq 1$, wherein x is preferably 1 (that is to say, Lithium Iron Phosphate of formula: $LiFePO_4$).

In the present invention, the material (E−) may preferably comprise:

graphitic carbons able to intercalate lithium, typically existing in forms such as powders, flakes, fibers or spheres (for example, mesocarbon microbeads) hosting lithium;

lithium metal;

lithium alloy compositions, including notably those described in U.S. Pat. No. 6,203,944 (3M INNOVATIVE PROPERTIES CO.) Mar. 20, 2001 and in WO 00/03444 (MINNESOTA MINING AND MANUFACTURING CO.) Jun. 10, 2005;

lithium titanates, generally represented by formula $Li_4Ti_5O_{12}$; these compounds are generally considered as "zero-strain" insertion materials, having low level of physical expansion upon taking up the mobile ions, i.e. $Li^+$;

lithium-silicon alloys, generally known as lithium silicides with high Li/Si ratios, in particular lithium silicides of formula $Li_{4.4}Si$;

lithium-germanium alloys, including crystalline phases of formula $Li_{4.4}Ge$;

silicon anodes;

silicon-carbon composite anodes.

An electrode made from the composition of the present invention generally comprises the active-electrode material in an amount of from 80 to 98 wt %, preferably from 85 to 97 wt %, more preferably from 87 to 96 wt %, with respect to the total weight of the electrode.

A solvent (C) is used in the composition according to the present invention, to disperse the binder, and other additive(s) in the composition and homogenizing them with a later added active-electrode material and all other suitable components to produce a paste to be applied to a current collector. Alternatively, the solvent (C) is used in the composition according to the present invention, to dissolve the binder, and other additive(s) in the composition and homogenizing them with a later added active-electrode material and all other suitable components to produce a paste to be applied to a current collector. In the present invention, the solvent in the composition is preferably an organic solvent. Examples of the organic solvent may include NMP, dimethylformamide, dimethylacetamide, N,N-dimethylaminopropylamine, tetrahydrofuran, dimethyl sulfoxide, and any combination thereof, but the present invention is not limited thereto. According to a preferred embodiment of the present invention, the NMP is used as the solvent in the composition.

In the present invention, the binder (B) in the composition may be selected from the group consisting of vinylidene fluoride (VDF) polymer (PVDF), polytetrafluoroethylene (PTFE), polyvinylacetate, ethylene-vinylacetate copolymer, polyimide (PI), polyamide (PA), polyvinyl chloride (PVC), polymethyl acrylate (PMA), polymethyl methacrylate (PMMA), polyether nitrile (PEN), polyethylene (PE), polypropylene (PP), polyacrylonitrile (PAN), polyethylene terephthalate (PET), polymethyl methacrylate, epoxy resin, polyurethane resin, urea resin, styrene-butadiene rubber (SBR), isoprene rubber, butadiene rubber, fluororubber, acrilonitrile-butadiene rubber (NBR), ethylene-propylene rubber, ethylene-propylene-diene terpolymer (EPDM), styrene-ethylene-butadiene-styrene copolymer, styrene-isoprene-styrene copolymer, or hydrogenated products thereof, starch, methyl cellulose, carboxymethyl cellulose, hydroxymethyl cellulose, hydroxyethyl cellulose, hydroxypropyl cellulose, carboxymethylhydroxyethyl cellulose, nitro cellulose, and any combination thereof.

The electrode-forming composition generally comprises the binder in an amount of 0.5 to 10 wt %, preferably from 1 to 8 wt %, with respect to the total weight of the composition.

Any conventional additives in the art may be further incorporated in the electrode-forming composition. One example of such additives includes a conductive additive. Without wishing to be bound by any theory, it is believed that the addition of conductive additive can enhance electron conductivity in the electrode. Examples of the conductive additive includes carbon-based materials, such as carbon black, acetylene black and graphite, carbon nanotube (CNT), graphene oxide, and any combination thereof, but the present invention is not limited thereto. The content of the conductive additive may be 0.5 to 15 wt %, preferably 1 to 10 wt %, more preferably 2 to 5 wt % with respect to the total weight of the electrode according to the present invention.

Generally known techniques in the art may be used for manufacturing the electrode from the electrode-forming composition. Exemplary method involves dissolving the binder in the solvent, uniformly mixing them with a powdery active-electrode material and rest of the components, such as the conductive additive, to result in a slurry or a paste. Thusly-obtained slurry or the paste can be applied onto a current collector, then dried and shaped under pressure by a heat treatment at a temperature of 50° C. to 250° C. for several hours (e.g. 2 hours) to result in the electrode. Often, the temperature for forming the electrode from the slurry can be from 50° C. to 150° C. It is to be understood that the present invention is not limited to the above exemplary methodology.

In the present invention, the cathode may comprise those active-electrode materials which can be advantageously used for the battery having a high nominal voltage. As such, in one embodiment of the present invention, the cathode comprises at least one active-electrode material selected from lithium-based composite metal oxides having a spinel structure, preferably $LiMn_2O_4$, or $Li_xMn_{2-y}M'_yA_4$ (wherein $0.95 \leq x \leq 1.1$, $0 \leq y \leq 0.5$, M' is Ni, and A is oxygen atom). In the present invention, the cathode preferably comprises at least one active-electrode material selected from lithium-based composite metal oxides having a layered structure, preferably $LiCoO_2$ and $LiNi_{1-y-z}Co_yMn_zO_2$ (in which $0<y<0.5$ and $0<z<0.5$).

The batteries of the present invention may be lithium secondary batteries, including a lithium-ion battery, a lithium sulfur battery, and a lithium air battery, and sodium secondary batteries, such as a sodium ion battery, and a sodium sulfur battery, in particular lithium-ion battery. In the present invention, the batteries having the high charge cut-off voltage are preferably secondary batteries, in particular secondary lithium-ion batteries.

The battery of the present invention can be prepared by utilizing one or more various methods known in the art, and can have a form of, for instance, prismatic or pouch type. Hereinafter, an example of the preparation of the battery according to the present invention will be explained, yet the present invention is not limited thereto.

First, an appropriate current collector foil for a cathode is prepared and a cathode-forming composition generally comprising an active cathode material, a binder, and a solvent, and optionally other additives, is applied on one side of the current collector. The current collector on which the cathode-forming composition is applied is dried to remove the solvent, thereby forming an active cathode material layer. Other means, such as additional heat, ultra-violet, radiation, and electron beam, may be applied during the drying. A temperature and time for this process are generally from 40 to 150° C. and 5 min. to 20 hours, respectively.

On the opposite side of the cathode, an appropriate current collector foil for an anode is prepared and an anode-forming composition generally comprising an active anode material, a binder, and a solvent, and optionally other additives, is applied on one side of the current collector. The current collector on which the anode-forming composition is applied is dried to remove the solvent, thereby forming an active anode material layer. Other means, such as additional heat, ultra-violet, radiation, and electron beam, may be applied during the drying. A temperature and time for this process are generally from 40 to 100° C. and 5 min. to 20 hours, respectively. The temperature for this process may be from 40 to 80° C.

Thusly-formed two components are stacked interposed by a separator (often made from an insulating polymer), and optionally wounded. An electrode terminal is joined to an outermost surface of the current collector. The resultant is introduced into a case and the case is partially sealed. An electrolyte composition generally comprising at least one solvent, at least one electrolyte, and optional additives is filled in the case by introducing the same via a pre-existing hole into the case, and the case is vacuum-sealed.

It has been also found that the compound of general formula (I) can provide an advantageous protection effect on the surface of at least one of the cathode and anode by forming the SEI on initial cycle of the battery. As such, without wishing to be bound by any theory, it is believed that the compound of general formula (I) can be advantageously used in the electrolyte composition for battery in combination with other additive(s) which is believed to be able to form the protection layer effectively on the surface of the electrode(s). Therefore, another aspect of the present invention concerns an electrolyte composition, comprising at least one solvent, at least one conductive salt, at least one compound selected from the group consisting of fluorinated ethylene carbonates and vinylene carbonate, and at least one compound of general formula (I):

$$R^1R^2CF\!-\!O\!-\!C(O)\!-\!O\!-\!R^3 \tag{I}$$

wherein $R^1$ and $R^2$ are independently H, F, alkyl, cycloalkyl, alkylene-aryl, or alkylene-heteroaryl; and wherein $R^3$ is an aryl group or an alkylene-aryl group.

The fluorinated ethylene carbonate is preferably monofluoroethylene carbonate.

In this aspect, the concentration of the compound of general formula (I) in the electrolyte composition is preferably from 0.1 to 5 wt %, preferably 0.2 to 1.5 wt %, more preferably 0.2 to 1 wt %, relative to the total weight of the electrolyte composition.

In this aspect, the concentration of the compound selected from the group consisting of fluorinated ethylene carbonates and vinylene carbonate in the electrolyte composition is preferably from 0.1 to 5 wt %, preferably 0.5 to 3.5 wt %, more preferably 1 to 2 wt %, relative to the total weight of the electrolyte composition.

In a particular embodiment, the electrolyte composition for battery according to the present invention comprises at least one solvent, at least one conductive salt, the compound of general formula (I), and vinylene carbonate. In this embodiment, both the compound of general formula (I) and vinylene carbonate are preferably used as additives. As such, the total concentration of the compound of general formula (I) and vinylene carbonate in the electrolyte composition is preferably no more than 5 wt %, more preferably no more than 3.5 wt %, relative to the total weight of the electrolyte composition. The total concentration of the compound of general formula (I) and vinylene carbonate in the electrolyte composition is often at least 0.1 wt %, more preferably at least 0.5 wt %, relative to the total weight of the electrolyte composition. It was surprisingly found by the present inventors that by using this particular electrolyte system which comprises both the compound of general formula (I) and vinylene carbonate as additive to the electrolyte, excellent results, especially outstanding cycle performance, can be obtained.

In another particular embodiment, the electrolyte composition for battery according to the present invention comprises 0.1~5.0 wt % of the compound of general formula (I) and 0.1~5.0 wt % of vinylene carbonate, relative to the total weight of the at least one solvent and the at least one conductive salt, provided the sum of the weight of the compound of general formula (I) and vinylene carbonate does not exceed 5.0 wt %. Preferably, the electrolyte composition for battery of the present invention comprises 0.5~2.5 wt % of the compound of general formula (I) and 0.1~5.0 wt % of vinylene carbonate, relative to the total weight of the at least one solvent and the at least one conductive salt, provided the sum of the weight of the compound of general formula (I) and vinylene carbonate does not exceed 5.0 wt %. The electrolyte composition for battery according to the present invention may further comprise one or more additives.

The electrolyte composition according to the present invention can be advantageously used in batteries, such as lithium secondary batteries, including a lithium-ion battery, a lithium sulfur battery, and a lithium air battery, and sodium secondary batteries, such as a sodium ion battery, and a sodium sulfur battery, or in capacitors, such as supercapacitor and hybrid capacitor. Thus, further aspect of the present invention concerns a battery or capacitor which comprises a cathode, an anode, and the electrolyte composition according to the present invention.

Still further aspect of the present invention provides the use of the compound of general formula (I) to decrease the interfacial resistance between an electrode and an electrolyte composition comprising said compound of general formula (I), wherein said electrode and said electrolyte composition is comprised in a battery or in a capacitor.

Yet further aspect of the present invention provides the use of the compound of general formula (I) in the high-voltage batteries, in particular the batteries having a charge cut-off voltage of more than 4.2 V. Such use often denotes an incorporation of the compound of general formula (I) into the electrolyte composition for high-voltage batteries. Such use often includes co-incorporation of vinylene carbonate into the electrolyte composition. As to the nature and preferred embodiment of the compound of general formula (I), the high-voltage batteries, and the electrolyte composition, reference can be made to the explanation given in the foregoing sections. Should the disclosure of any patents, patent applications, and publications which are incorporated herein by reference conflict with the description of the present application to the extent that it may render a term unclear, the present description shall take precedence.

The invention will now be further described in examples without intending to limit it.

EXAMPLES

Examples 1~6: Preparation of Electrolyte Compositions

The following additive(s) in Table 1 was added to a standard electrolyte composition [(1.0M LiPF$_6$/ethylene carbonate+dimethyl carbonate (1:2 (v/v)] under dry room atmosphere.

TABLE 1

| | Additive |
|---|---|
| Example 1 (Comparative) | None |
| Example 2 (Inventive) | 1 wt % of (1-fluoroethyl)phenyl carbonate |
| Example 3 (Comparative) | 3 wt % of vinylene carbonate |
| Example 4 (Comparative) | 3 wt % of monofluoroethylene carbonate |
| Example 5 (Inventive) | 1.5 wt % of vinylene carbonate + 0.5 wt % of (1-fluoroethyl)phenyl carbonate |
| Example 6 (Inventive) | 1.5 wt % of monofluoroethylene carbonate + 0.5 wt % of (1-fluoroethyl)phenyl carbonate |

Example 7: Construction of Battery Cell

Test system: mono full cell consisting of: [LiCoO$_2$: SuperP® (conductive carbon black obtainable from MMM Carbon, Belgium): PVdF (Solef® 5130 from Solvay Specialty Polymers) binder=92:4:4 (wt. %)] as positive electrode and [SCMG-AR® (artificial graphite obtainable from Showa Denko): Super-P® (conductive carbon black obtainable from MMM Carbon, Belgium): PVdF (Solef® 5130 from Solvay Specialty Polymers) binder=90:4:6 (wt. %)] as negative electrode. Polyethylene was used as separator. The electrolyte compositions according to Examples 1 to 6 were used.

The preparation of the mono cells consisted of the following steps in that order: (1) mixing, (2) coating & Drying (3) pressing, (4) slitting, (5) Tap welding, (6) assembly, (7) Electrolyte filling, and (8) Vacuum sealing.

Example 8: Performance Test

For the cycle performance test, 250 cycles were performed by applying a cut-off voltage of 3.0 V to 4.4 V under C-rate of 1.0. The results were summarized in Table 2.

TABLE 2

|  | Retention after 250 cycles (%) |
| --- | --- |
| Example 1(Comparative) | 87.8 |
| Example 2(Inventive) | 93.0 |
| Example 3(Comparative) | 91.8 |
| Example 4(Comparative) | 92.8 |
| Example 5(Inventive) | 97.0 |
| Example 6(Inventive) | 94.1 |

For an impedance analysis, 250 cycles were performed with the four mono cells, each containing the electrolyte composition according to Example 1, Example 2, Example 3, and Example 5, by applying a cut-off voltage of 3.0 V to 4.4 V under C-rate of 1.0 C. AC impedance measurements were performed using a VMP3 (available from Biologic Science instruments) impedance analyzer over a frequency range of 10 mHz to 100 kHz with an amplitude of 10 mV. The results were summarized in Table 3.

TABLE 3

|  | Relative interfacial resistance (%) |
| --- | --- |
| Example 1(Comparative) | 100% |
| Example 2(Inventive) | About 73% |
| Example 3(Comparative) | About 86% |
| Example 5(Inventive) | About 67% |

Example 9: Construction of Battery Cell Using LiNi$_{1/3}$Co$_{1/3}$Mn$_{1/3}$O$_2$ Test system: mono full cell consisting of: [LiNi$_{1/3}$Co$_{1/3}$Mn$_{1/3}$O$_2$: Super-P® (conductive carbon black obtainable from MMM Carbon, Belgium): PVdF (Solef® 5130 from Solvay Specialty Polymers) binder=95:3:2 (wt. %)] as positive electrode and [SCMG-AR® (artificial graphite obtainable from Showa Denko): Super-P® (conductive carbon black obtainable from MMM Carbon, Belgium): PVdF (Solef® 5130 from Solvay Specialty Polymers) binder=90:4:6 (wt. %)] as negative electrode. Polyethylene was used as separator. The electrolyte compositions according to Examples 1 and 2 were used.

The preparation of the pouch cells consisted of the following steps in that order: (1) mixing, (2) coating & Drying (3) pressing, (4) slitting, (5) Tap welding, (6) assembly, (7) Electrolyte filling, and (8) Vacuum sealing.

Example 10: Performance Test

For the cycle performance test, 500 cycles were performed by applying a cut-off voltage of 3.0 V to 4.3 V under C-rate of 1.0. The results were summarized in Table 4.

TABLE 4

|  | Retention after 500 cycles (%) |
| --- | --- |
| Example 1(Comparative) | 90.3 |
| Example 2(Inventive) | 91.0 |

The results indicate that the inventive electrolyte system (Example 2) shows substantially lower interfacial resistance than that was attained by the comparative electrolyte systems, even lower than the interfacial resistance achievable by the use of vinylene carbonate (VC) additive, and therefore, can be advantageously used as an excellent additive to the electrolyte for batteries. Also, the electrolyte system (Example 5) shows even lower interfacial resistance than that was attained by the comparative electrolyte systems, and therefore, can be outstanding electrolyte system for batteries. In addition, the inventive electrolyte systems according to Examples 2 and 5 show good result in terms of cycle performance under the high voltage operation. Among them, the electrolyte comprising blend additive system containing both VC and (1-fluoroethyl)phenyl carbonate (Example 5) shows particularly outstanding result in terms of the cycle performance under the high voltage operation.

The invention claimed is:

1. A battery which comprises a cathode, an anode, and an electrolyte composition, having a nominal voltage of more than 3.7 V and no more than 4.7 V, wherein the electrolyte composition comprises at least one solvent, at least one conductive salt, and a compound of general formula (I), $$R^1R^2CF—O—C(O)—O—R^3 \quad (I)$$

wherein $R^1$ and $R^2$ are independently H, F, alkyl, cycloalkyl, alkylene-aryl, or alkylene-heteroaryl; and wherein $R^3$ is an aryl group or an alkylene-aryl group.

2. The battery according to claim 1, wherein $R^3$ is phenyl or benzyl.

3. The battery according to claim 1, wherein $R^2$ is H.

4. The battery according to claim 1, wherein $R^1$ is H or an alkyl group.

5. The battery according to claim 4, wherein $R^1$ is methyl.

6. The battery according to claim 1, wherein $R^1$ is methyl, $R^2$ is H, $R^3$ is phenyl, and the compound is (1-fluoroethyl) phenyl carbonate.

7. The battery according to claim 1, wherein the concentration of the compound of general formula (I) is from 0.1 to 5 wt %, relative to the total weight of the electrolyte composition.

8. The battery according to claim 7, wherein the concentration of the compound of general formula (I) is from 0.2 to 1.5 wt %, relative to the total weight of the electrolyte composition.

9. The battery according to claim 1, wherein the cathode comprises at least one active-electrode material selected from lithium-based composite metal oxides having a spinel structure.

10. The battery according to claim 9, wherein the cathode comprises LiMn$_2$O$_4$, or Li$_x$Mn$_{2-y}$M'$_y$A$_4$, wherein $0.95 \le x \le 1.1$, $0 \le y \le 0.5$, M' is Ni, and A is oxygen atom.

11. The battery according to claim 1, having a nominal voltage of at least 3.9 V and no more than 4.1 V.

12. The battery according to claim 1, which is lithium ion battery.

13. An electrolyte composition, comprising at least one solvent, at least one conductive salt, at least one compound selected from the group consisting of fluorinated ethylene carbonates and vinylene carbonate, and at least one compound of general formula (I):

$$R^1R^2CF\text{—}O\text{—}C(O)\text{—}O\text{—}R^3 \qquad (I)$$

wherein $R^1$ and $R^2$ are independently H, F, alkyl, cycloalkyl, alkylene-aryl, or alkylene-heteroaryl; and wherein $R^3$ is an aryl group or an alkylene-aryl group.

14. The electrolyte composition according to claim 13, which comprises (1-fluoroethyl)phenyl carbonate, and at least one of monofluoroethylene carbonate and vinylene carbonate.

15. The electrolyte composition according to claim 13, wherein the concentration of the compound of general formula (I) is from 0.1 to 5 wt %, relative to the total weight of the electrolyte composition.

16. The electrolyte composition according to claim 15, wherein the concentration of the compound of general formula (I) is from 0.2 to 1.5 wt %, relative to the total weight of the electrolyte composition.

17. The electrolyte composition according to claim 16, wherein the concentration of the compound of general formula (I) is from 0.2 to 1 wt %, relative to the total weight of the electrolyte composition.

18. The electrolyte composition according to claim 13, wherein the concentration of the compound selected from the group consisting of fluorinated ethylene carbonates and vinylene carbonate is from 0.1 to 5 wt %, relative to the total weight of the electrolyte composition.

19. A battery or capacitor which comprises a cathode, an anode, and the electrolyte composition according to claim 13.

20. A method to decrease the interfacial resistance between an electrode and an electrolyte composition in a battery or in a capacitor comprising incorporating into the electrolyte composition a compound of general formula (I):

$$R^1R^2CF\text{—}O\text{—}C(O)\text{—}O\text{—}R^3 \qquad (I)$$

wherein $R^1$ and $R^2$ are independently H, F, alkyl, cycloalkyl, alkylene-aryl, or alkylene-heteroaryl; and wherein $R^3$ is an aryl group or an alkylene-aryl group.

* * * * *